US009567878B2

(12) United States Patent
Lang et al.

(10) Patent No.: US 9,567,878 B2
(45) Date of Patent: Feb. 14, 2017

(54) ACTUATOR FOR HYDRAULIC VALVE OF CAM PHASER AND HYDRAULIC VALVE WITH ACTUATOR FOR CAM PHASER

(71) Applicant: Hilite Germany GmbH, Marktheidenfeld (DE)

(72) Inventors: Matthias Lang, Roden-Ansbach (DE); Dietmar Schulze, Muenzenberg (DE)

(73) Assignee: Hilite Germany GmbH, Marktheidenfeld (DE)

( * ) Notice: Subject to any disclaimer, the term of this patent is extended or adjusted under 35 U.S.C. 154(b) by 118 days.

(21) Appl. No.: 14/750,008

(22) Filed: Jun. 25, 2015

(65) Prior Publication Data

US 2016/0024976 A1  Jan. 28, 2016

(30) Foreign Application Priority Data

Jul. 25, 2014  (DE) .................. 10 2014 010 876

(51) Int. Cl.
| *F01L 9/02* | (2006.01) |
| *F01L 1/34* | (2006.01) |
| *F16K 31/06* | (2006.01) |
| *F16K 27/04* | (2006.01) |
| *F01L 1/344* | (2006.01) |
| *H01F 7/128* | (2006.01) |
| *H01F 7/16* | (2006.01) |

(52) U.S. Cl.
CPC .............. *F01L 1/34* (2013.01); *F01L 1/3442* (2013.01); *F16K 27/048* (2013.01); *F16K 31/0613* (2013.01); *H01F 7/128* (2013.01); *H01F 7/1623* (2013.01); *F01L 2001/3443* (2013.01); *F01L 2001/34433* (2013.01)

(58) Field of Classification Search
CPC .......... F01L 1/34; F01L 1/3442; F01L 1/3443; F01L 1/34433; F16K 27/048; H01F 7/128
USPC ............. 123/90.11, 90.12, 90.15, 90.17
See application file for complete search history.

(56) References Cited

U.S. PATENT DOCUMENTS

| 7,513,230 B2 * | 4/2009 | Knecht ............ F01L 1/34 123/90.15 |
| 2006/0071560 A1 | 4/2006 | Ermert et al. |
| 2007/0158604 A1 | 7/2007 | Kondo et al. |
| 2008/0196777 A1 | 8/2008 | Ross et al. |
| 2012/0175540 A1 | 7/2012 | Hase |
| 2013/0068975 A1 | 3/2013 | Kondo et al. |

FOREIGN PATENT DOCUMENTS

| DE | 102006011078 A1 | 9/2007 |
| DE | 102007033060 | 1/2009 |
| DE | 102009043320 B4 | 4/2011 |

* cited by examiner

*Primary Examiner* — Ching Chang
(74) *Attorney, Agent, or Firm* — Von Rohrscheidt Patents

(57) ABSTRACT

An actuator for a hydraulic valve of a cam phaser, the actuator including a magnet housing receiving a magnetized metal sleeve and a coil that is radially enveloped by the magnetized metal sleeve generating a magnetic field, wherein the coil is fixated in a non-magnetizable coil carrier that is positioned in a cavity of the magnet housing, wherein the coil carrier at least partially envelops a pole core and a pole core yoke that is axially offset from the pole core, wherein the pole core and a pole core yoke are positioned so that they radially define a non-magnetic sleeve, wherein the non-magnetic sleeve forms a divider wall between the cavity of the magnet housing and an inner cavity of the non-magnetic sleeve.

11 Claims, 2 Drawing Sheets

ACTUATOR FOR HYDRAULIC VALVE OF CAM PHASER AND HYDRAULIC VALVE WITH ACTUATOR FOR CAM PHASER

RELATED APPLICATIONS

This application priority from and incorporates by reference German Patent application DE 10 2014 010 876.7, filed on Jul. 25, 2014 which is incorporated in its entirety by this reference.

FIELD OF THE INVENTION

The invention relates to an actuator for a hydraulic valve of a cam phaser according to the preamble of patent claim 1 and a hydraulic valve with an actuator for a cam phaser according to the preamble of patent claim 11.

BACKGROUND OF THE INVENTION

Hydraulic valves for cam phasers are well known in the art. The hydraulic valves include a valve piston which is axially moveable in a valve housing of the hydraulic valve. Typically a first operating connection, a second operating connection and a supply connection are configured at the valve housing. The first operating connection and the second operating connection are connected with the cam phaser and a hydraulic fluid is feedable through these connections into the hydraulic valve and also out of the hydraulic valve. In order to supply the hydraulic valve with the hydraulic fluid fed by a feed device the valve housing includes the supply connection. The hydraulic fluid can flow through the hydraulic valve in different directions using a flowable channel system of the valve piston.

The valve piston is moved using an electromagnetic actuator. Thus the actuator includes a generally axially moveable plunger which is operatively connected with the valve piston. An axial movement of the plunger is transferred to the valve piston so that the valve piston changes its position within the hydraulic valve.

Since the hydraulic valve is flowed through by a hydraulic fluid, typically a hydraulic oil, the actuator has to be securely sealed relative to the hydraulic valve so that so that in particular a coil of the electromagnetic actuator is sealed against penetration of the hydraulic fluid.

Furthermore the coil has to be protected against a penetration of hydraulic fluid which is disposed in the actuator itself. This hydraulic valve is provided for moving an armature that is operatively connected to the plunger since the armature is moveably received in the actuator to provide axial movement to the plunger.

The publication document US 2006/0071560 A1 discloses an actuator which includes a sleeve for separating the coil from the hydraulic fluid that is necessary for moving the armature, wherein the armature is received axially moveable in an interior of the sleeve. The sleeve defines an interior of the sleeve relative to the cavity of the actuator, wherein the cavity is mostly defined by a coil carrier and a pole yoke. A pole core insert that is at least partially received in an interior of the sleeve closes the interior relative to a hydraulic valve which is arrangeable opposite to the pole core insert, so that the plunger of the actuator can move a valve piston of the hydraulic valve. The cavity is defined by a lip of the sleeve relative to a hydraulic fluid of the actuator, wherein the lip is configured as a lip disc that is provided with steps.

The printed document DE 10 2006 011 078 A1 discloses an actuator configured as a lift magnet which includes an armature with a plunger, wherein the plunger is arranged axially moveable within an interior of a sleeve. A pole core insert is at least partially received in the interior. The sleeve includes a coil carrier for receiving the coil that is to be loaded with a voltage. The pole core insert closes the interior of the sleeve relative to the switching valve that is arrangeable opposite to the pole core insert. At an end of the sleeve that is configured oriented towards the pole core insert a lip of the sleeve configured as a lip disc is arranged which is positioned between the coil carrier and a conical disc supporting the pole core insert, wherein the lip closes a cavity of the actuator relative to the hydraulic fluid of the actuator wherein the cavity is largely formed by the coil carrier.

An actuator for a hydraulic valve which includes a cylindrical sleeve can be derived from the patent document DE 10 2009 043 320 B4. The actuator is configured for a hydraulic valve of a cam phaser with a magnet housing which is used for receiving a magnetized metal sleeve or a magnet. The metal sleeve envelops a coil radially which is configured for generating a magnetic field. The coil is received non moveable in a non-magnetizable coil carrier that is positioned in the magnet housing. A non-magnetize able sleeve forms a divider wall between an interior cavity of the sleeve and a pole core and a pole core yoke that is axially offset from the pole core, which are at least partially enveloped by the pole carrier and arranged in a cavity of the magnet housing. In the sleeve an axially moveable armature and a plunger operatively connected with the armature are arranged for positioning a valve piston of the hydraulic valve. The sleeve closes the interior relative to the cavity using a disc shaped lip configured at the sleeve at an end oriented towards the hydraulic valve. A pole core insert mostly received in the interior closes the interior relative to the hydraulic valve, wherein a seal element is arranged between the lip and the hydraulic valve.

BRIEF SUMMARY OF THE INVENTION

Thus it is an object of the present invention to provide an actuator for a hydraulic valve of a cam phaser wherein a coil of the actuator is securely protected against a penetration of hydraulic fluid. It is another object of the invention to provide a hydraulic valve with an actuator for a cam phaser wherein the hydraulic valve provides improved properties.

The object is achieved according to the invention by an actuator for a hydraulic valve of a cam phaser, the actuator including a magnet housing receiving a magnetized metal sleeve and a coil that is radially enveloped by the magnetized metal sleeve generating a magnetic field, wherein the coil is fixated in a non-magnetizable coil carrier that is positioned in a cavity of the magnet housing, wherein the coil carrier at least partially envelops a pole core and a pole core yoke that is axially offset from the pole core, wherein the pole core and a pole core yoke are positioned so that they radially define a non-magnetic sleeve, wherein the non-magnetic sleeve forms a divider wall between the cavity of the magnet housing and an inner cavity of the non-magnetic sleeve, wherein an armature and a plunger that is operatively connected with the armature and axially moveable along a longitudinal axis of the actuator are arranged in the inner cavity of the magnetic sleeve, wherein a hydraulic fluid which improves mobility of the armature is provided in the inner cavity of the magnetic sleeve, wherein the plunger positions a valve piston of a hydraulic valve, wherein the plunger is able to contact the valve piston, wherein the plunger is configured to penetrate an entire pole core insert, wherein the pole core insert is positioned in the magnet housing so that the pole core insert is arrangeable adjacent to the hydraulic valve that is flowable by the hydraulic fluid, wherein the armature is moveable when a voltage is applied to the coil, wherein the pole core insert closes the inner cavity of the non-magnetic sleeve and the cavity of the magnet housing relative to the hydraulic valve wherein a first seal element is arranged in the cavity of the magnet housing between the pole core insert and the coil carrier wherein the first seal element envelops the non-magnetic sleeve and seals the coil against a hydraulic fluid of the hydraulic valve and against the hydraulic fluid of the inner cavity of the non-magnetic sleeve.

The additional object is achieved according to the invention by a hydraulic valve with an actuator axially moving a valve piston of the hydraulic valve which valve piston is received axially moveable in a valve housing, wherein a plunger of the actuator is operatively connected with the valve piston, and wherein the actuator is configured as described supra.

The actuator according to the invention for a hydraulic valve of a cam phaser includes a magnet housing which is used for receiving a magnetized metal sleeve or a magnet. The metal sleeve radially envelops a coil which is configured for generating a magnetic field. The coil is received non moveable in a coil carrier that is positioned in the magnet housing and which is not magnetizable. A non magnetizable sleeve forms a divider wall between an interior of the sleeve and a pole core and a pole care yoke that is axially offset from the pole core which are both at least partially enveloped by the coil carrier and arranged in a cavity of the magnet housing. In an interior an armature with a plunger that is operatively connected with the armature is arranged axially moveable along a longitudinal axis of the actuator wherein a hydraulic fluid is provided in the interior for improved movability of the armature. The plunger is configured so that it can contact a valve piston of the hydraulic valve wherein the plunger can axially penetrate a pole core insert completely which pole core insert is arrangeable in the magnet housing opposite or adjacent to the hydraulic valve. The armature is moved in axial direction when voltage is applied to the coil due to a magnetic field that is generated by the metal sleeve, the pole core, the pole core yoke, the pole core insert and the coil. For protection or for sealing the coil against a penetration of hydraulic fluid from the hydraulic valve that can be arranged adjacent thereto and also against penetration of the hydraulic fluid that is provided in an interior of the sleeve, the pole core insert is configured so that it closes the interior relative to the hydraulic valve as well as relative to the cavity of the magnet housing, wherein a first seal element is arranged between the pole core insert and the coil carrier in the cavity so that it envelops the sleeve.

The positioning of the first seal element between the pole core insert and the cavity that is closed by the pole core insert relative to the hydraulic valve on the one hand side leads to a secure protection of the coil relative to a penetration of the hydraulic fluid of the hydraulic valve. On the other hand side protection against hydraulic fluid exiting from the sleeve is also provided since the first seal element is configured so that it envelops the sleeve, thus at an enveloping surface of the sleeve.

Advantageously the first seal element is arranged in a portion of an end of the sleeve which portion is oriented towards the pole core insert so that the coil is protected against a penetration of hydraulic fluid even when hydraulic fluid exits from the sleeve.

In order to facilitate fabrication the pole core includes a first pole disc at an end that is configured oriented towards the pole core insert wherein the first pole disc is operatively connected with the pole core, wherein the first seal element is positioned between the pole core insert and the first pole disc so that further improved safety against penetration of hydraulic fluid into the coil is provided.

In another embodiment the sleeve includes a lip that can be positioned oriented towards the pole core insert, wherein the first seal element is arranged adjacent to the lip and adjacent to the pole core insert.

For improved sealing the lip is configured cambered in its axial extension. This provides significantly improved sealing compared to a known sleeve with a substantially radially extending lip since the hydraulic fluid would have to overcome at least two directional changes similar to a labyrinth seal before a transit in its flow direction.

In particular the lip includes a lip ring and a lip disc connected with the lip ring, wherein the lip ring and the lip disc are connected with one another enclosing an angle between each other. This means the sleeve with the lip is configured pot shaped and can be manufactured in a very simple manner in particular when forming a 90° angle for example with a simple deep drawing process since no undercuts are formed. Furthermore this lip shape provides a stop for the pole core insert.

In another embodiment of the actuator according to the invention the first seal element is positioned between the lip and the magnet housing so that the first seal element envelops the lip. Thus in addition to the lip the first seal element is used for sealing the coil against a penetration of hydraulic fluid. Advantageously the first seal element is configured so that it envelops the lip ring of the lip.

The hydraulic valve according to the invention advantageously includes an actuator with the features of one of the patent claims 1-10 for axially moving a valve piston of the hydraulic valve that is arranged axially moveable in a valve housing of the Hydraulic valve, wherein a plunger of the actuator is operatively connected with the valve piston so that a reliable and thus improved operation of the hydraulic valve can be implemented.

BRIEF DESCRIPTION OF THE DRAWINGS

Further advantages features and details of the invention can be derived from the subsequent description of the embodiments with reference to the drawing figures. The features recited in the preceding description and feature combinations therefrom and the features and feature combinations individually recited in the subsequent figure description and/or in the figures are not only useable in the respectively stated combinations but also in other combinations or by themselves without departing from the spirit and scope of the invention, identical or equivalent elements are designated with identical reference numerals. For reasons of clarity it is feasible that the elements are not provided with their respective reference numerals in all drawing figures without losing their association, wherein.

DETAILED DESCRIPTION OF THE INVENTION

A cam phaser that is not illustrated in more detail facilitates changing opening and closing times of gas control valves of the internal combustion engine during operation of the combustion engine that is not illustrated in more detail. Thus, using the cam phaser a relative angular position of a cam shaft that is not illustrated in more detail of the internal combustion engine is continuously varied relative to a crank shaft which is not illustrated in more detail of the internal combustion engine, wherein the cam shaft if rotated relative to the crank shaft. Rotating the cam shaft moves opening and closing times of the gas control valves so that the internal combustion engine delivers its optimum power at a respective speed.

For this purpose the cam phaser includes chambers that are not illustrated in more detail and which are filled or emptied as a function of a desired positioning of the cam shaft. The chambers are arranged adjacent to one another and are respectively loaded with hydraulic fluid or emptied in an alternating pattern, this means when one chamber is filled the other chamber is emptied. This alternating filling and emptying causes a change of the cam shaft position through rotation.

Figure 1:
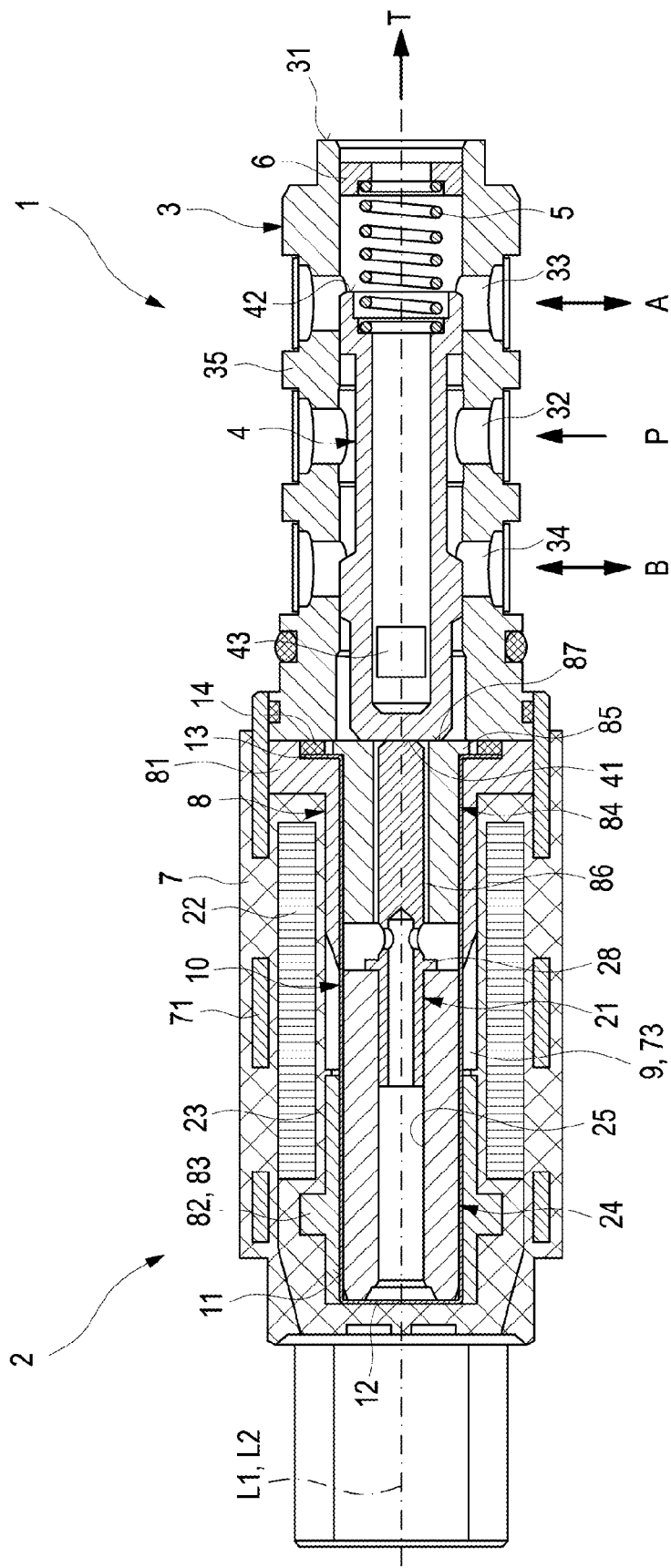
FIG. 1 illustrates a longitudinal sectional view of a known actuator with a hydraulic valve.

In order to fill or empty the cavities with hydraulic fluid a known hydraulic valve 1 is configured according to FIG. 1 which includes an actuator 2 which is used for controlling the hydraulic valve 1. The actuator 2 is electromagnetic. The actuator 2 and the hydraulic valve 1 are adjacent to one another wherein a first longitudinal axis L1 of the hydraulic valve 1 is configured coaxial with a second longitudinal axis L2 of the actuator 2.

FIG. 1 illustrates the hydraulic valve 1 in a longitudinal sectional view in a first valve position. The hydraulic valve 1 is configured similar to a cartridge valve and includes a valve housing 3 in which a valve piston 4 is arranged axially moveable.

In order to move the valve piston 4 a first face 41 of the valve piston 4 that is oriented towards the actuator 2 is closed so that a plunger of the electromagnetic 2 can contact the first face 41 at this location. Loading the actuator 2 with electrical power leads to an axial movement of the valve piston 4, wherein a retaining element 5 arranged at a second face 42 of the valve piston 4, which second face is oriented away from the first face 41, imparts a retaining force upon the valve piston 4 against which retaining force the valve piston 4 has to be moved. The retaining element 5, in this embodiment configured as a compression coil spring, is supported at a hollow cylinder 6 which is arranged with a press fit in the valve housing 3 in the portion of a housing face 41 oriented away from the actuator 2.

The bushing shaped valve housing 3 includes a supply connection P, a first operating connection A and a second operating connection B. The supply connection P, the first operating connection A and the second operating connection B are respectively associated with a first ring groove 32, a second ring groove 33 and a third ring groove 34 which are respectively connected with the connections through connection channels that are not illustrated in more detail. The connection channels are configured so that they completely penetrate a housing wall 35 of the valve housing 3.

The supply connection P is configured to be connected with an oil pump that is not illustrated in more detail so that the hydraulic valve 1 is supplyable with the hydraulic fluid which is oil in this embodiment. The operating connections A, B are connectable with the respective cavities so that the hydraulic fluid can flow into the valve piston 4 through these operating connection or flow out the valve piston 4. A tank connection T is configured at the housing face 31.

Depending on the positioning of the flowable valve piston 4 which is axially moved by the plunger 21, either the operating connection A is connected in a flow able manner with the supply connection P or the supply connection P is connected with the operating connection B in a flowable manner. When the operating connection A is connected in a flow able manner with the supply connection P the flow able connection of the operating connection B with the tank connection T is configured as a pass through opening 43 that completely penetrates the valve piston 4 in the radial direction. However, when the operating connection B is connected with the supply connection P in a flow able manner the operating connection A is directly connected with the tank connection T in a flow able manner.

The essentially cylindrical electromagnetic actuator 2 includes a coil 22 which is enveloped by magnetizable metal sleeves 71 or a magnet housing 7 including magnets. The magnet housing 7 is produced as an injection molded plastic component, wherein the metal sleeves 71 are embedded in the plastic component. The coil 22 is fixated by a coil carrier 23 enveloping the coil 22, wherein the coil carrier 23 is fixated at the magnet housing 7.

A pole core 8 is configured within the magnet housing 7 wherein the pole core 8 is configured with a pole core flange 81. The pole core flange 81 is configured with a contact to the metal sleeve 71 which axially protrudes beyond the magnet housing 7.

The coil carrier 23 that is injection molded from plastic material is supported at the pole core flange 81. A hollow cylindrical pole core yoke 82 is configured integrally in one piece with a first pole core disc 83 and fixated in the coil carrier 23 axially offset by an air gap 9 from the sleeve shaped pole core 8. The actuator 2 includes a thin non magnetize able cylindrically formed sleeve 10 which is enveloped at its outer enveloping surface 11 essentially by the pole core yoke 82 and the pole core 8, wherein the pole core yoke 82 and the pole core 8 contact the outer enveloping surface 11 of the sleeve 10.

The sleeve 10 includes a base 12 so that sleeve 10 is configured closed on one side. The base 12 is axially supported at the coil carrier 23. The sleeve 10 includes a lip 13 at its open side that is oriented towards the base 12. This lip 13 axially supports the sleeve 10 at the pole core flange 81 and is used for axially securing the pole core 8.

The sleeve 10 is used for receiving a hollow cylindrical armature 24 and a hollow cylindrical pole core insert 84 that is axially offset from the armature 24. The plunger 21 is fixated in a press fit at its end that is oriented away from the first face 41 in a receiving opening 25 of the armature 24, wherein an anti-stick disc 28 of the plunger 21 which is configured disc shaped at the plunger 21 forms a stop for supporting the plunger at the armature 24. Thus, the plunger 21 is operatively connected with the armature 24 and an axial movement of the armature is transferable to the plunger 21.

For contacting the first face 41 the plunger 21 axially extends through a pass through opening 86 which axially penetrates the pole core insert 84 entirely and moves axially in the pass through opening 86 due to a movement of the armature 24.

The pole core insert 84 includes a pole core insert shoulder 85 at its end oriented away from the armature 24, wherein the pole core insert band is configured flush with the pole core flange 81. Put differently this means that a flat boundary surface 87 is formed adjacent to the hydraulic valve 1. In order to seal the actuator 2 relative to hydraulic fluid escaping from the hydraulic valve 1 a first seal element 14 is arranged axially between the lip 13 and the opposite valve housing 3 and radially between the pole core insert shoulder 85 and the pole core flange 81.

Figure 2:
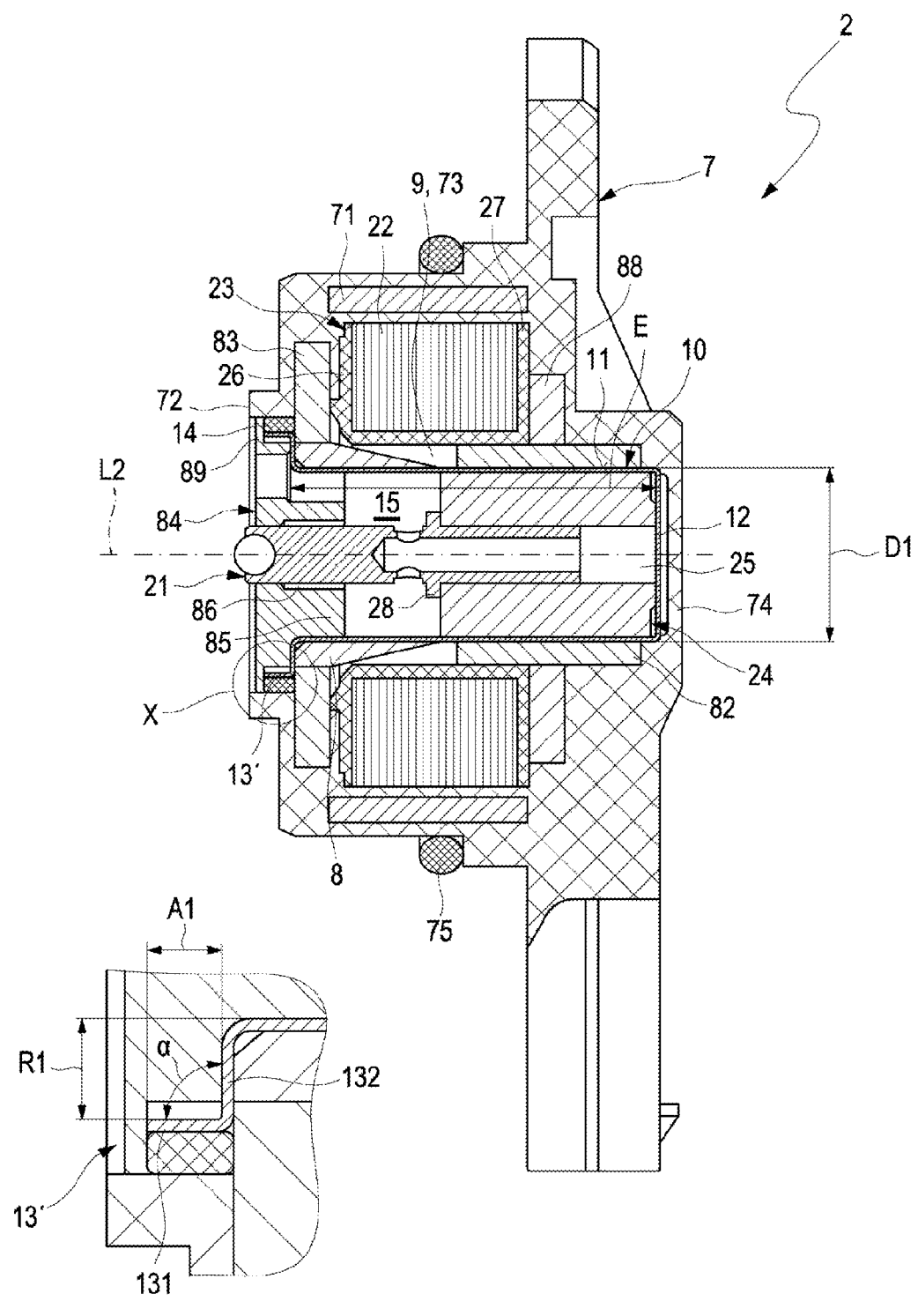
FIG. 2 illustrates a longitudinal sectional view of an actuator according to the invention.

An actuator 2 according to the invention is illustrated in FIG. 2. The coil 22 is received non moveable in the coil carrier 23. The magnet sleeve 71 is arranged in the magnet housing 7 offset from the coil 22 in radial direction. Axially adjacent to the coil carrier 23, the first pole disc 83 is arranged on a first side 26 of the coil carrier 23 wherein the first side of the coil carrier 23 can be positioned towards the hydraulic valve 1 and on the second side 27 of the coil carrier 23 which is configured oriented away from the first side 26 a second pole disc 88 is arranged.

The first pole disc 83, the second pole disc 88, the coil carrier 23 with the coil 22 and the magnet sleeve 7 are arranged in the magnet housing 7 non moveable, wherein the magnet housing 7 configured as an injection molded plastic components supports said components. The magnet housing 7 includes a housing shoulder 72 at its side that is orientable towards the hydraulic valve 1.

In a cavity 73 of the magnet housing 7 which cavity is radially enveloped by the coil carrier 23, the first pole disc 83 and the second pole disc 88, the pole core 8 is configured adjacent to the first pole disc 83 and the hollow cylindrical pole core yoke 82 is configured adjacent to the second pole disc 88, wherein the pole core 8 and the pole core yoke 82 are axially offset from one another maintaining the air gap 9.

The actuator 2 includes a thin non-magnetizable cylindrical sleeve 10 which is essentially enveloped at its outer enveloping surface 11 by the pole core yoke 82 and by the pole core 8, wherein the pole core yoke 82 and the pole core 8 contact the outer enveloping surface of the sleeve 10.

The hollow cylindrical armature 24 and the hollow cylindrical pole core insert that is axially offset from the armature 24 are received in the sleeve 10 wherein the armature 24 is axially moveable in the sleeve 10 for positioning the plunger 21 that is press fitted into the armature 24. In order to axially move the armature 24 hydraulic fluid is present in the inner cavity 15.

The sleeve 10 includes the base 12 so that the sleeve 10 is closed on one side, wherein the base 12 is axially supported at a rear wall 74 of the magnet housing 7. At its open side oriented away from the base 12 the sleeve 10 includes a lip 13. Independently from the lip 13 the sleeve 10 is configured without shoulders over its axial extension, this means that it only has one diameter D1.

The lip 13' is configured curved in its axial extension. Put differently the lip 13' includes a lip ring 131 axially extending over a first length A1 and a lip disc 132 radially extending over a second length R1, wherein the lip ring 131 and the lip disc 132 are axially connected with one another forming an angle α which is ideally 90°. Thus, the sleeve 10 can be produced as a simple deep drawn component.

Thus, the sleeve 10 is fixated unmovable in the magnet housing 7 at an end of the sleeve 10 which includes the lip 13' wherein the fixation is provided using the pole core insert 84. The pole core insert 84 is received in the magnet housing 7 unmovable and the cavity 73 on one side and on the other side the sleeve 10 at its open end including the lip 13' are configured closeable.

A disc shaped annular shoulder 89 which is configured so that it radially envelops the pole core insert shoulder 85 at a side of the pole core insert 84 oriented away from the armature 24 is used for axially supporting the sleeve 10 wherein the lip ring 131 is configured so that it contacts the annular shoulder 89. In detail "X" of FIG. 2 the lip 13' is clearly illustrated.

The lip ring 131 is completely enveloped by the first seal element 14 over its radial circumference, wherein the first seal element 14 is received axially between the first pole disc 83 and the annular lip 89.

Thus the pole core insert 84 closes the inner cavity 15 and the cavity 73 wherein the curved or angled lip 13' is used as a stop for the pole core insert 84 and for positioning a first seal element 14, so that a secure sealing of the coil 22 is provided against a penetration of hydraulic fluid on one side from the inner cavity 15 and on the other hand side against a penetration of hydraulic fluid from the hydraulic valve 1.

A second seal element 75 radially envelops the magnet housing 7 for sealing it externally.

REFERENCE NUMERALS AND DESIGNATIONS 1 hydraulic valve
2 actuator
3 valve housing
4 valve piston
5 retaining element
6 hollow cylinder
7 magnet housing
8 pole core
9 air gap
10 sleeve
11 outer jacket surface
12 base
13, 13' lip
14 first seal element
15 inner cavity
21 plunger
22 coil
23 coil carrier
24 armature
25 receiving opening
26 first side
27 second side
28 anti-stick disc
31 housing face
32 first ring groove
33 second ring groove
34 third ring groove
35 housing wall
41 first face
42 second face
43 pass through opening
71 metal sleeve
72 housing shoulder
73 cavity
74 rear wall
75 second seal element
81 pole core flange
82 pole core yoke
83 first pole disc
84 pole core insert
85 pole core insert shoulder
86 pass through opening
87 boundary surface
88 second pole disc
89 annular lip
131 lip ring
132 lip disc
A first operating connection
A1 first length
B second operating connection D1 diameter
E extension
L1 first longitudinal axis
L2 second longitudinal axis
P supply connection
R1 second length
T tank connection
α angle

What is claimed is:

1. An actuator for a hydraulic valve of a cam phaser, the actuator comprising:
   a magnet housing receiving a magnetized metal sleeve and a coil that is radially enveloped by the magnetized metal sleeve generating a magnetic field,
   wherein the coil is fixated in a non-magnetizable coil carrier that is positioned in a cavity of the magnet housing,
   wherein the non-magnetizable coil carrier at least partially envelops a pole core and a pole core yoke that is axially offset from the pole core,
   wherein the pole core and a pole core yoke are positioned so that they radially define a non-magnetic sleeve,
   wherein the non-magnetic sleeve forms a divider wall between the cavity of the magnet housing and an inner cavity of the non-magnetic sleeve,
   wherein an armature and a plunger that is operatively connected with the armature and axially moveable along a longitudinal axis of the actuator are arranged in the inner cavity of the non-magnetic sleeve,
   wherein a hydraulic fluid which improves mobility of the armature is provided in the inner cavity of the non-magnetic sleeve,
   wherein the plunger positions a valve piston of a hydraulic valve, wherein the plunger is able to contact the valve piston,
   wherein the plunger is configured to penetrate an entire axial extension of a pole core insert, wherein the pole core insert is positioned in the magnet housing so that the pole core insert is arrangeable adjacent to the hydraulic valve that is flowable by the hydraulic fluid,
   wherein the armature is moveable when a voltage is applied to the coil,
   wherein the pole core insert closes the inner cavity of the non-magnetic sleeve and the cavity of the magnet housing relative to the hydraulic valve wherein a first seal element is arranged in the cavity of the magnet housing between the pole core insert and the non-magnetizable coil carrier wherein the first seal element envelops the non-magnetic sleeve and seals the coil against a hydraulic fluid of the hydraulic valve and against the hydraulic fluid of the inner cavity of the non-magnetic sleeve.

2. The actuator according to claim 1, wherein the first seal element is positioned between the pole core insert and a first pole disc.

3. The actuator according to claim 1,
   wherein the non-magnetic sleeve includes a lip that is arrangeable oriented towards the pole core insert, and
   wherein the first seal element is arranged adjacent to the lip and adjacent to the pole core insert.

4. The actuator according to claim 3, wherein the lip is configured cambered in an axial extension of the lip.

5. The actuator according to claim 3,
   wherein the lip includes a lip ring and a lip disc connected with the lip ring, and
   wherein the lip ring and the lip disc are connected with one another enclosing an angle between each other.

6. The actuator according to claim 5, wherein the non-magnetic sleeve has a constant inner diameter over an axial extension of the non-magnetic sleeve up to the lip disc.

7. The actuator according to claim 1,
   wherein the first seal element envelops a lip of the non-magnetic sleeve which lip is oriented towards the pole core insert, and
   wherein the first seal element is positioned between the lip and the magnet housing.

8. The actuator according to claim 7, wherein the first seal element envelops a lip ring of the lip.

9. The actuator according to claim 1, wherein a lip oriented towards the pole core insert is configured complementary to a contour of the pole core insert.

10. The actuator according to claim 1, wherein the pole core insert is at least partially received non moveable in the inner cavity of the non-magnetic sleeve.

11. A hydraulic valve with an actuator axially moving a valve piston of the hydraulic valve which valve piston is received axially moveable in a valve housing,
   wherein a plunger of the actuator is operatively connected with the valve piston, and
   wherein the actuator is configured according to claim 1.

* * * * *